Patented Nov. 7, 1922.

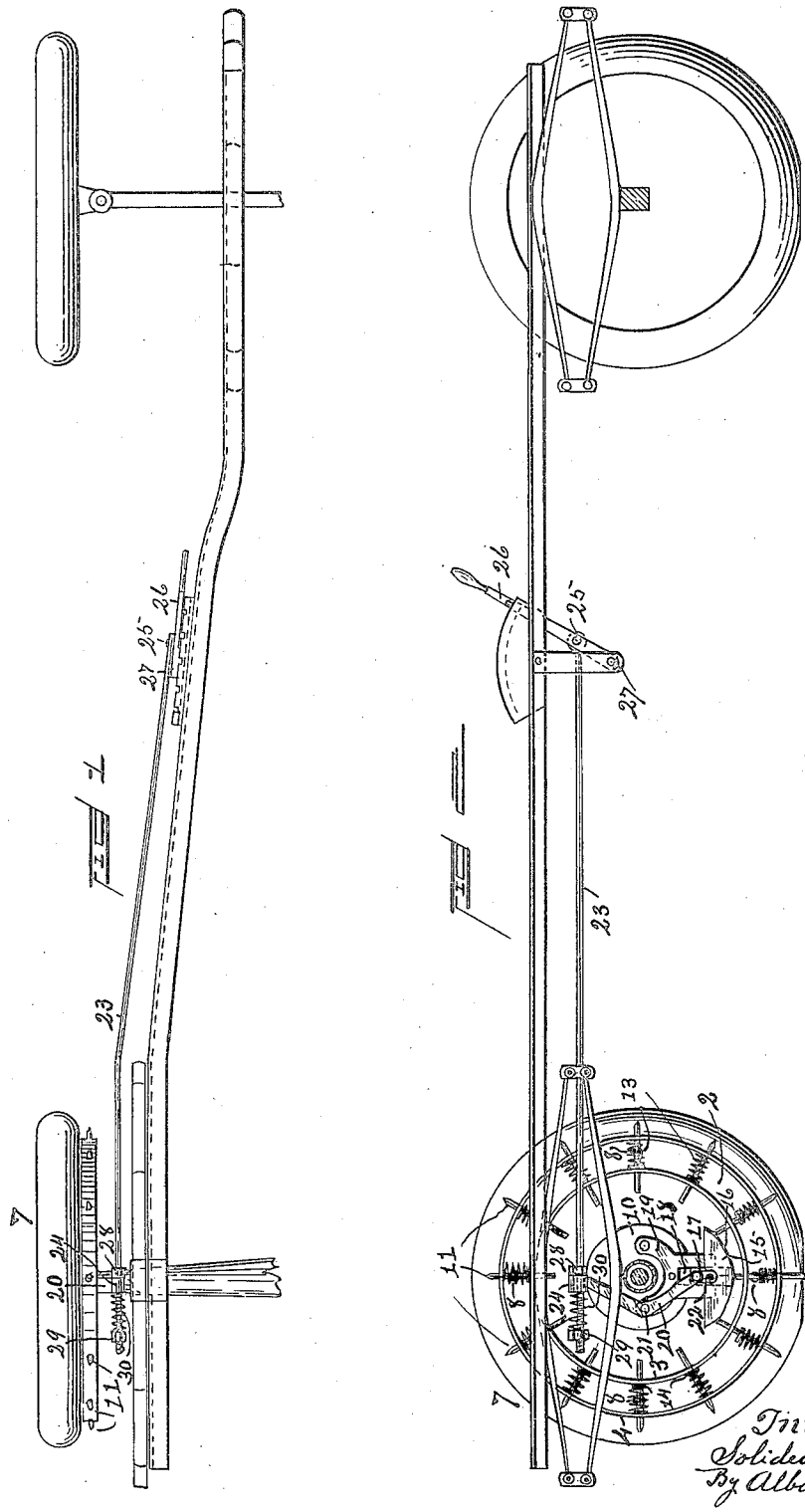

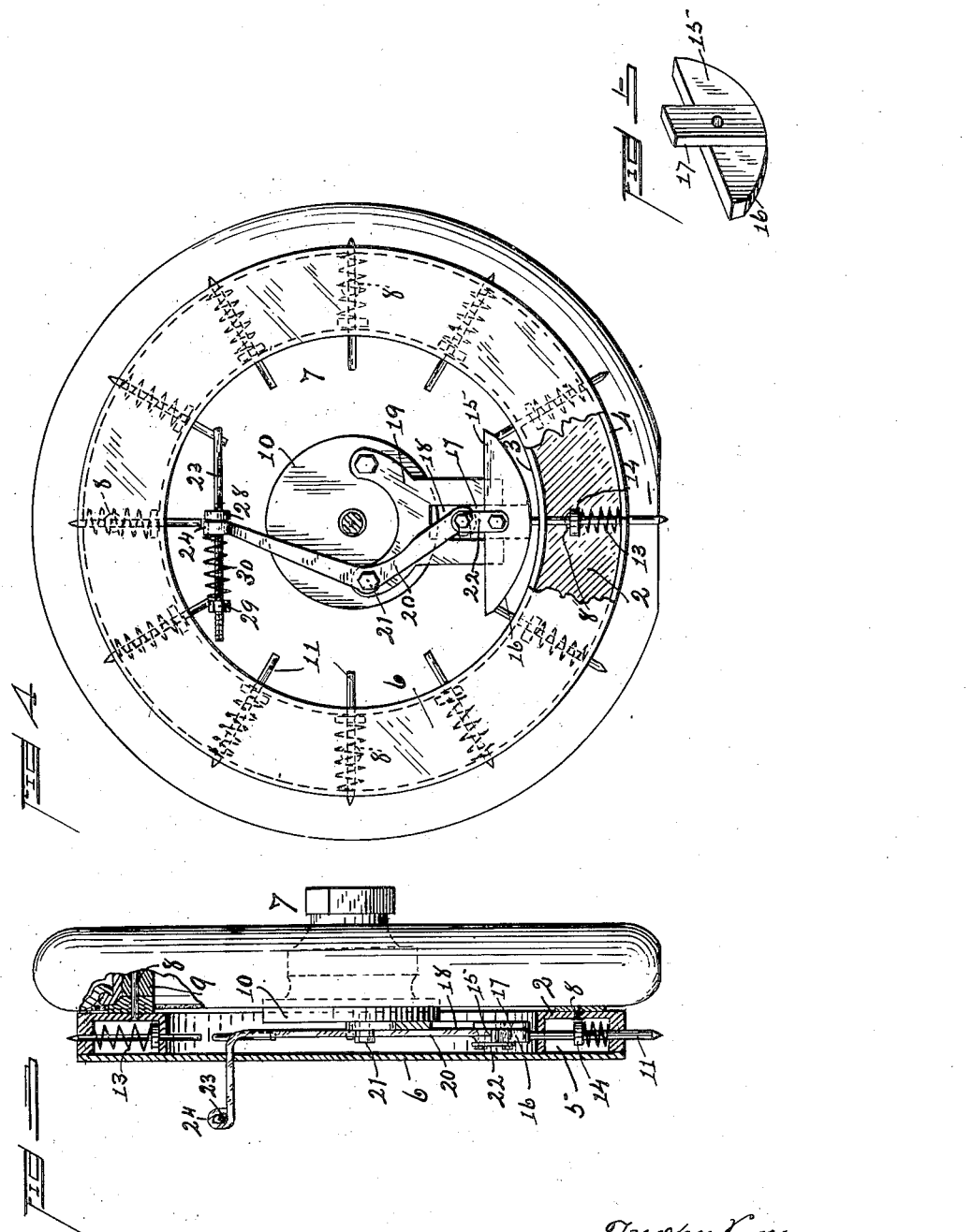

1,434,527

UNITED STATES PATENT OFFICE.

SOLIDEO BREDICE, OF WATERBURY, CONNECTICUT.

ANTISKID ATTACHMENT.

Application filed November 12, 1921. Serial No. 514,564.

*To all whom it may concern:*

Be it known that I, SOLIDEO BREDICE, a subject of the King of Italy, and a resident of Waterbury, in the county of New Haven and State of Connecticut, have invented certain new and useful Improvements in Antiskid Attachments, which improvements are fully set forth in the following specification.

This invention relates to improvements in mechanisms of that class available conjunctively with a carrying-wheel, or with carrying-wheels, of a vehicle, particularly an automobile, for preventing the skidding of such vehicle on ice-covered surfaces or surfaces otherwise rendered slippery, such mechanisms being well-designated antiskid attachments.

The object of this invention is to provide an antiskid attachment which shall, be simple and comparatively inexpensive as regards its construction; durable, efficient and dependable in practical service; convenient in its application to practical purposes; and which shall possess certain well-defined advantages over prior analogous constructions.

The invention consists in certain combinations, details and parts whereby, together with the novel disposition and relative arrangement of said parts, the attainment of the foregoing object is rendered practicable, all of which will be hereinafter more particularly referred to and set forth in the claims hereto appended.

The invention is clearly illustrated in the accompanying drawing, wherein:

Fig. 1 is a plan view of an antiskid attachment embodying my said improvements, the same being shown in its application to a carrying-wheel, together with the chassis, of a motor-vehicle.

Fig. 2 is a side elevation of same, including the motor vehicle members to which the attachment is more directly applied.

Fig. 3 is a diametric section thereof, the scale enlarged.

Fig. 4 is a side elevation of the construction shown in Fig. 3, the scale enlarged.

Fig. 5 is a detail view showing in perspective and detached the spike-actuating cam made use of.

In a general sense my present invention comprises an annular spike-carrier attachable to a carrying-wheel of a vehicle and supporting a plurality of radially operable spikes, together with means whereby the lowermost spike in the series thereof made use of may be caused, at the will of the driver of such vehicle, to move radially downward for a non-skid engagement at its downwardly projecting end with the track-way surface thereunder, said spike automatically undergoing a return movement into its normal position, as the vehicle continues to move along, in either direction.

In carrying out my present invention, reference being had to the accompanying drawings, wherein similar reference-characters denote like parts throughout the several views, I provide an annular spike-carrier which is here shown as comprising a flat ring-like back 2 fitted with continuous, inturned concentrically arranged flanges 3, 4, forming between them a continuous, annular channel 5, which channel is closed, by preference, by means of a flat ring-like cover 6, clearly illustrated in Figs. 3 and 4 of the accompanying drawings.

The carrier aforenamed is provided for attachment to a carrying-wheel, as 7, of a motor vehicle, as through the medium of fastening bolts 8, piercing the back 2 and the felloe, as 9, of such carrying-wheel, said spike-carrier occupying, when thus disposed for service, a position at the inner face of the carrying wheel, concentric to the brake-drum, as 10, of the vehicle, and being turnable as a unit with the carrying-wheel whereon the same is mounted.

The carrier aforenamed is fitted with a plurality of surface-penetrating spikes 11, the same being spaced, circumferentially of the carrier, and by preference, equi-distant apart and freely piercing radially, each the concentrically opposed flanges 3, 4, and being fitted, each with a controlling spring 13 which tends at all times to elastically hold its cooperating spike retracted, such spike having a stop 14 fixed thereon and whereby, conjunctively with the inner flange 3, of the carrier, retractive action of the spike under the stress of the spring 13, is normally and definitely limited.

It is essential that means be provided whereby the spikes aforenamed may be successively protracted for the purpose specified at a point adjacent the lowermost segment of the carrying-wheel whereon the spike-carrier is mounted and as said carrying-wheel continues to turn under movement of the vehicle of which the carrying-wheel constitutes a part; and to the attainment of this end I provide a cam-block 15, affording a working cam-face 16, and fitted, in this instance, with an offset stem 17, said stem having a working sliding fit in a vertical, open-ended slot 18 formed in a suitable guide-hanger 19, said guide-hanger being fastened to and depending from any suitable stationary part of the vehicle, as the brake-drum 10 thereof, and whereby the cam-face of the cam-block aforenamed becomes shiftable vertically into and out of the plane of movement of the inner ends of the spikes 11, the latter being normally positioned.

Hence, when cam-block 15 is depressed, its cam-face will engage successively the inner ends of the spikes 11, the carrying-wheel undergoing its turning movement, and thereby cause each of said spikes to undergo a radial protractive action sufficient to cause its outer end to advance duly alongside of and with respect to the adjacent lowermost segment of the carrying-wheel tire for a non-skid engagement with the track-way surface thereunder.

It will be understood that each of the spikes which shall have been thus protracted will, as its inner end disengages the cam-face 16 and under the action of its controlling-spring automatically return to its normal position.

It is further essential that means be provided whereby the cam-block 15 may be duly shifted, for the purpose stated, to bring its cam-face into and out of the plane of movement of the inner ends of the spikes aforenamed; and in this connection I contemplate providing an operating lever 20, rockable on a pivot 21, and flexibly connected at its lower end through the medium of an intermediate link 22, with the cam-block 15, whereby, under a pulling or pushing stress duly applied to said lever at its upper terminus, the cam-block 15, with its stem operating in the slot 18, will be caused to undergo accordingly a downward movement or a retractive upward movement alongside of the guide-hanger 19, as will be clearly understood.

For actuating the lever 20 for the purpose stated I contemplate providing an operating-rod 23, here shown as loosely projecting at its rear end-portion through the eye 24 of the lever 20 and hingedly connected at its forward end, as at the point 25, with a suitable initial lever 26, positioned within convenient reach of the driver of the vehicle, on a carrying-wheel of which my improved attachment shall be mounted, and rockable on a suitable fulcrum, as 27.

The operating-rod 23 is fitted with a stop 28 which engages and takes reversely with it the upper portion of the operating-lever 20, when the initial lever 26 shall be reversely rocked on its fulcrum 27; and said operating-rod is further fitted, in this instance, with an adjusting-nut 29, here shown as having a threaded engagement with that portion of the operating-rod 23 which projects rearwardly beyond the eye 24 of the operating-lever 20, there being further provided a cushioning spring 30, which spirally encircles said operating-rod between the eye 24 and the nut 29, and whereby is permitted an elastic return action on the part of the cam-block 15, independently of said operating-rod and whenever the advance end of any protracted spike shall encounter and engage any non-yielding obstruction, as a stone, thereby eliminating objectionable shocks or vibrations which might otherwise attend the on-movement of the vehicle to which the attachment is applied.

It will be noted further in this connection that a forward thrust of the initial lever 26 will cause a corresponding pull, cushioned through the medium of the spring 30 and whose tension may be adjusted through the medium of the nut 29, to be transmitted by means of the operating-rod 23 to the operating-lever 20, thereby causing the latter to rock forwardly on its fulcrum 21 and cam-block 15 to be lifted sufficiently to bring its cam-face 16 out of the plane of movement of the inner ends of the spikes made use of, this latter adjustment of the parts being effected whenever the anti-skid action of the attachment is not required.

It may be here pointed out that each spike protracted as hereinbefore explained serves both as a pulling unit and as a unit whereby lateral skidding of the vehicle to which the attachment may be applied is effectually and definitely overcome.

The operation of my improved attachment will be apparent from the foregoing description thereof; and it will be seen that the attachment, being comparatively inexpensive in its construction, positive in action, and readily controllable by the driver of a vehicle to which the same may be applied, is well adapted for the purposes for which it is intended.

It will be further seen that the attachment may be modified to a considerable extent, particularly in its details of construction, without material departure being made from the spirit and principle of my invention as set forth in and coming within the scope of the claims hereto appended.

Having thus described my invention, I claim:

1. An antiskid attachment comprising an annular carrier attachable to a carrying-wheel of a vehicle, at one face thereof, and supporting a series of spring-controlled, radially projectile spikes; a shiftable cam whereby, when directly actuated, the spikes aforenamed are successively protracted at a point adjacent the lowermost segment of said carrying-wheel, under on-movement of the vehicle, and each against the stress of its controlling spring; and means whereby the cam aforenamed may be duly actuated at the will of the user, said means including a bell-crank and an intermediate link, the latter flexibly connecting said bell-crank directly with said cam.

2. An antiskid attachment comprising an annular carrier attachable to a carrying-wheel of a vehicle, at one face thereof, and supporting a series of spring-controlled, radially projectile spikes; a shiftable cam whereby, when directly actuated, the spikes aforenamed are successively protracted at a point adjacent the lowermost segment of the carrying-wheel, under on-movement of the vehicle, and each against the stress of its controlling spring; and means whereby the cam aforenamed may be duly actuated at the will of the user, said means including a bell crank, an intermediate link and an operating-rod, said link flexibly connecting the bell-crank directly with said cam and said operating-rod having a cushioned connection directly with said bell-crank.

3. Cam-actuating means for an antiskid attachment, said means including a rockable operating-lever having a terminal eye; an operating-rod projecting loosely through said terminal eye; a stop on said operating-rod adjacent and in advance of said eye; an adjusting-nut on said operating-rod rearwardly of said eye; and a cushioning spring, said spring spirally encircling said operating-rod between the eye aforenamed and the adjusting-nut aforenamed.

4. An anti-skid attachment comprising an annular carrier attachable to a carrying-wheel of a vehicle at one face thereof and supporting a series of spring-controlled, radially projectile spikes; a shiftable cam-block having a working face lying in the plane of the spikes aforenamed, and whereby, when the cam-block is duly actuated, said spikes are successively protracted at a point adjacent the lowermost segment of the vehicle carrying-wheel, under on-movement of the vehicle, and each against the stress of its controlling spring; a guide-hanger duly supported out of the plane of the spikes aforenamed and affording a single, open-ended, vertical slot, said cam-block fitted with a stem duly offset and having a working fit within the slot aforenamed of said guide-hanger; and means whereby the cam-block aforenamed may be duly actuated at the will of the user, said means including a bell-crank, an intermediate link and an operating-rod, said link flexibly connecting the bell-crank directly with said cam-block and said operating-rod having a cushioned connection directly with said bell-crank.

SOLIDEO BREDICE.